United States Patent [19]

Doll

[11] Patent Number: 5,540,412
[45] Date of Patent: Jul. 30, 1996

[54] ELECTRO-MAGNETICALLY OPERATED BIDIRECTIONAL TWO-WAY AIR VALVE

[75] Inventor: Robert A. Doll, Glendale, Wis.

[73] Assignee: Applied Power Inc., Butler, Wis.

[21] Appl. No.: 524,359

[22] Filed: Sep. 5, 1995

[51] Int. Cl.$^6$ .................................................... F16K 31/02
[52] U.S. Cl. ...................... 251/129.07; 251/282; 251/117
[58] Field of Search .................... 251/129.07, 129.15, 251/129.01, 282, 333, 117

[56] References Cited

U.S. PATENT DOCUMENTS

| | | | |
|---|---|---|---|
| 2,543,010 | 2/1951 | Gardner | 251/129.07 |
| 4,852,853 | 8/1989 | Toshio et al. | 251/129.07 |
| 5,238,222 | 8/1993 | Sumida et al. | 251/129.15 X |
| 5,314,163 | 5/1994 | Bacardit | 251/129.07 |
| 5,328,147 | 7/1994 | Stobbs . | |
| 5,377,720 | 1/1995 | Stobbs et al. . | |

OTHER PUBLICATIONS

Applicant's Exhibit 1, p. 141, "Directional Control Valves Series DS162C & DS162N" of Parker Motion & Control, Hydraulic Valve Division, Elyria, Ohio 44035, admitted prior art.

Applicant's Exhibit 2, p. 75, entitled "Check Valves Series CV081P and CV091P" of Parker Motion & Control, Hydraulic Valve Division, Elyria, Ohio 44035, admitted prior art.

Primary Examiner—Kevin Lee
Attorney, Agent, or Firm—Quarles & Brady

[57] ABSTRACT

An electro-magnetically operated bidirectional two-way air valve capable of changing state at high pressure differentials or high flow rates in either direction has a body which defines a main bore in which an armature is slidably received. The body has a first port and a second port with a seat between them formed at the end of the main bore and a plastic valve element is secured to a neck portion of the armature to seat against the seat when the valve is closed. Frusto-conical surfaces are formed on the valve element and on the neck portion and a transversely extending pin across the main bore retains the armature in the main bore. In a second embodiment, an end of the armature tapers so as to reduce drag, a powder metal flow restrictor is provided in an axial bore in the armature to reduce shift speed and an elastomer bumper is provided to reduce operating noise.

12 Claims, 1 Drawing Sheet

ELECTRO-MAGNETICALLY OPERATED BIDIRECTIONAL TWO-WAY AIR VALVE

BACKGROUND OF THE INVENTION

1. Field of the Invention

This invention relates to electro-magnetically operated fluid control valves, and in particular two such valves which are bidirectional and two-way.

2. Discussion of the Prior Art

In certain applications, electro-magnetically operated valves are needed to operate for flow in either direction through them at relatively high air pressures and flow rates. For example, a blocking valve for automotive suspension air springs may need to change state (between open or closed) up to a pressure of 400 psi and may be required to handle a flow rate in either direction in excess of 100 SCFM. At such pressures and flow rates, known air valves have exhibited excessive leakage and/or have tended to be noisy in operation. Accordingly, this invention seeks to provide an electro-magnetically operated bidirectional two-way air valve which can change state at high pressures or flow rates, is relatively quiet in operation, and exhibits low leakage.

SUMMARY OF THE INVENTION

The invention provides an electro-magnetically operated bidirectional two-way air valve capable of shifting between open and closed at high pressure differentials and high flow rates in either direction. A valve of the invention has a body with a main bore, a first port, a second port and a seat formed on an end of the main bore between the first port and the second port. The first port is coaxial with the main bore outside of the seat and the second port opens into a wall of the main bore inside of the seat. A magnetically attractable armature is slidably received in the main bore, and the armature has a lapping portion at a distal end thereof which is of a diameter which is received in close sliding contact in the main bore and a neck portion at a proximal end thereof which is coaxial with the main bore. The neck portion extends past the second port toward the first port from the lapping portion, a largest diameter portion of the neck portion being smaller than the diameter of the lapping portion and defining a first axial face facing the first port. A valve element is secured against the face and extends beyond the largest diameter portion for seating on the seat in a closed position of the valve. An axial bore is formed in the armature from an end of the armature which is adjacent to the first port to an opposite end of the armature. A flow restriction, such as an air permeable sintered metal plug, may be provided in the bore to lower shift speed.

In a preferred aspect, the valve element is made of plastic. This provides softness for compliance, low leakage and noise reduction. In this aspect, the valve element preferably has a frusto-conical surface formed thereon facing the seat so that the frusto-conical surface seats on the seat in the closed position of the valve. This also helps compliance of the element to the seat, reduces noise, improves shift speed and also helps provide a laminar flow path through the valve past the seat which aids in the operation of the valve. Further in this aspect, the neck portion preferably has a frusto-conical surface formed thereon on a second axial face which is opposite from the first axial face and which tapers in the same axial direction as the frusto-conical surface formed on the valve element, to provide a substantially unrestrained flow path through the valve.

In addition, an axial face may be formed on the armature at a junction of the neck portion and lapping portion. The body may include a pin which extends across the main bore displaced from the main bore axis, a side of the pin abutting the face of the lapping portion, or a soft bumper to reduce noise, to retain the armature in the bore and simplify the construction of the valve. Moreover, the valve element is preferably annular, with a shank of the neck portion extending through the valve element and a jam nut, which may be shaped so as to reduce drag, threaded onto the shank to secure the valve element against the first axial face, as a low cost way to secure the valve element to the neck portion.

These and other objects and advantages of the invention will be apparent from the detailed description and drawings.

DETAILED DESCRIPTION OF THE PREFERRED EMBODIMENTS

Figure 1:
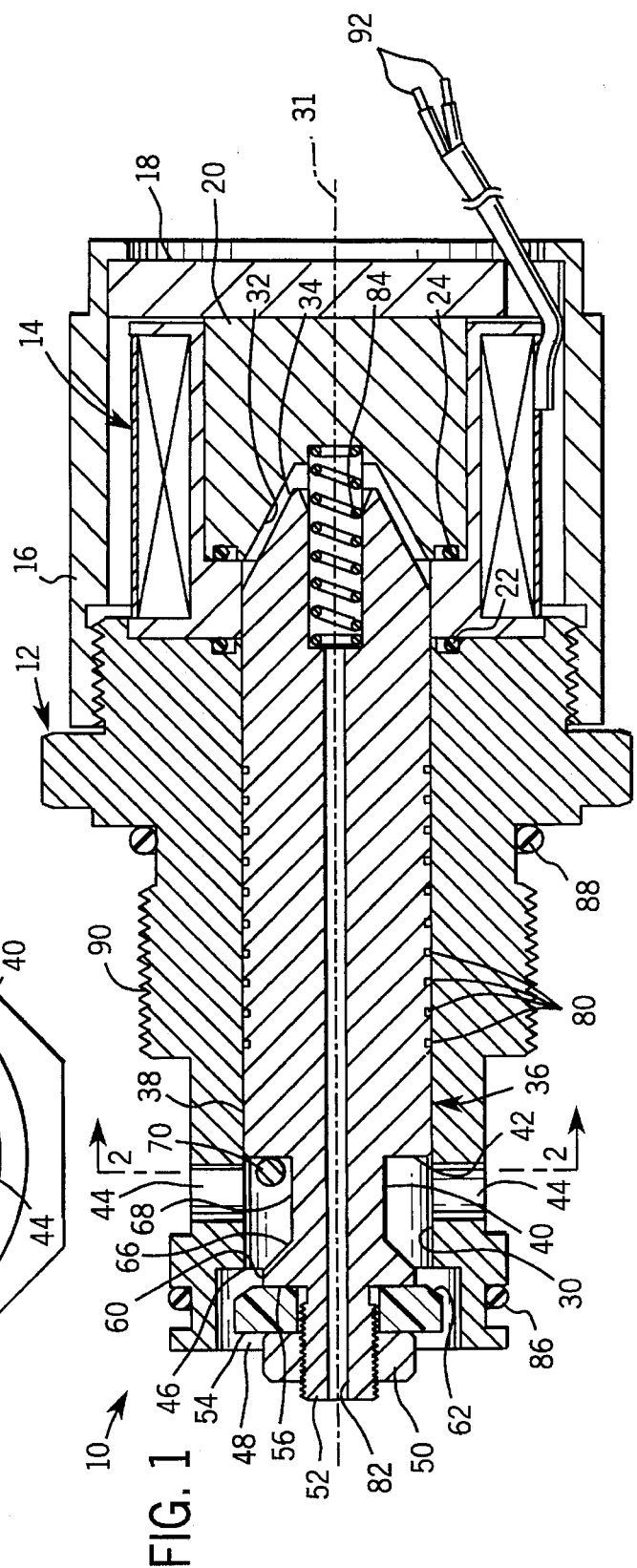
FIG. 1 is a cross-sectional view of a bidirectional two-way electro-magnetically operated air valve of the invention.

FIG. 1 illustrates a valve 10 of the invention having a body 12 with a coil assembly 14 secured at a distal end of the body 12 by a coil can 16 which is threaded onto the body 12 and secures a coil cap 18. The coil assembly 14 surrounds a pole piece 20, which is made of a magnetic material such as steel (as is the body 12), and O-rings 22 and 24 provide a fluid tight seal between the coil assembly 14 and the body 12 and pole piece 20, respectively.

The body 12 defines a main bore 30 which extends at its distal end through the coil assembly 14 and terminates in the pole piece 20 with a frusto-conical surface 32. A mating frusto-conical surface 34 is formed on the distal end of an armature 36 and, specifically, on the distal end of lapping portion 38 of armature 36. The armature 36 is also preferably made of a magnetic material, such as steel. At the proximal end of lapping portion 38, the armature 36 includes a neck portion 40 which extends from axial face 42 of lapping portion 38 past second ports 44 and past seat 46 and into and beyond first port 48. Two of the second ports 44 are provided opening into the main bore 30, although more or less openings could be provided as the ports 44. A jam nut 50 is threaded onto shank 52 of neck portion 40 and secures valve element 54, which is annular and through which shank 52 extends, against axial face 56 of neck portion 40.

Valve element 54 extends beyond face 56 and beyond first diameter 60 of neck portion 40 to seat against seat 46. For this purpose, valve element 54 has frusto-conical surface 62 to seat against seat 46. Valve element 54 is preferably made of a plastic material, such as glass filled nylon or any other suitable plastic. The first diameter 60 is inward of valve element 54 and is substantially smaller in diameter than main bore 30 to allow flow past it. A second frusto-conical surface 66 of the neck portion 40 is inward of the valve element 54 (between the valve element 54 and the second ports 44, and tapers in the same direction as the frusto-conical surface 62, so as to create a relatively open, smooth and unobstructed flow path past element 54 and neck portion 40 when the valve 10 is open.

The second frusto-conical surface 66 is coterminous at its distal end with second diameter 68 of the neck portion 40 which is coterminous at its distal end with axial face 42, which is an annular surface.

A stop pin 70 traverses the main bore 30 at a position which is displaced from the axis 31 of the main bore so as to abut axial face 42 in a fully opened position of the armature 36 and retain armature 36 in the bore 30. Stop pin 70 is a roll pin and is pressed into axially aligned holes 72 and 74 formed in the body 12. The lapping portion 38 of armature 36 is relatively long in comparison to its diameter, preferably its length being over three times its diameter, to provide a long lap length for low leakage past it. Several pressure equalization grooves 80 are formed around the outside of the lapping portion 38 to equalize the pressure acting around the outside of the lapping portion 38 so that the armature 36 does not bind as it slides in the bore 30.

An axial through bore 82 extends from the end of armature 36 adjacent to first port 48 co-axially all the way through armature 36 to the distal end which is adjacent to pole piece 20. At the distal end of the bore 82, the bore 82 is enlarged to receive compression spring 84 which acts between the armature 36 and pole piece 20 (a shallow bore being formed in pole piece 20 so as to locate the distal end of spring 84) so as to bias the armature 36 open.

O-rings 86 and 88 are provided around the body 12 so as to seal the first port 48 from the second ports 44 with O-ring 86 and to seal second ports 44 from atmospheric pressure acting outside of valve 10 with O-ring 88. Threads 90 are formed on the body 12 so as to secure the valve 10 in the manifold in which the valve 10 is assembled. Wires 92 are connected to the coil assembly 14 so as to provide a means for electrically energizing the coil assembly 14 with either an analog or a pulse width modulated electrical signal. The magnetic field created pulls armature 36 toward pole piece 20 so as to close valve element 54 against seat 46.

The invention provides a bidirectional two-way air valve which provides quiet operation even at high pressure differentials and at high flow rates. Flow through the valve may be either from first port 48 to second ports 44 or from second ports 44 to first port 48, in either case the valve being capable of accommodating a flow rate up to 105 SCFM and capable of closing up to approximately 400 psi.

Figure 3:
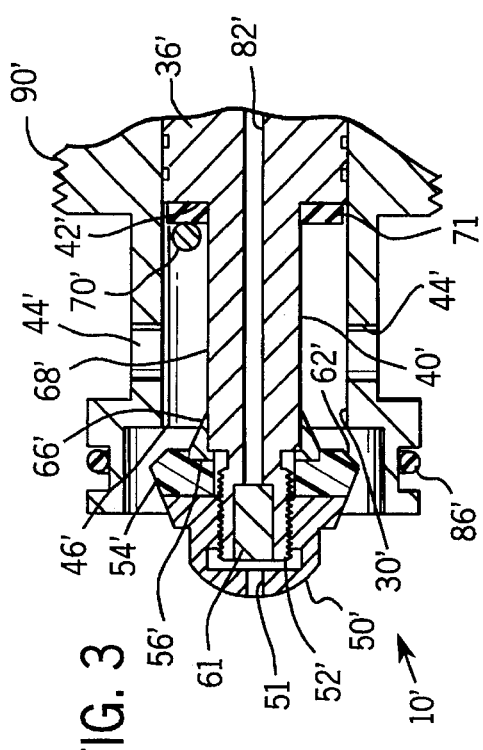
FIG. 3 is a fragmentary view similar to FIG. 2 but showing an alternate embodiment of the invention.
Figure 2:
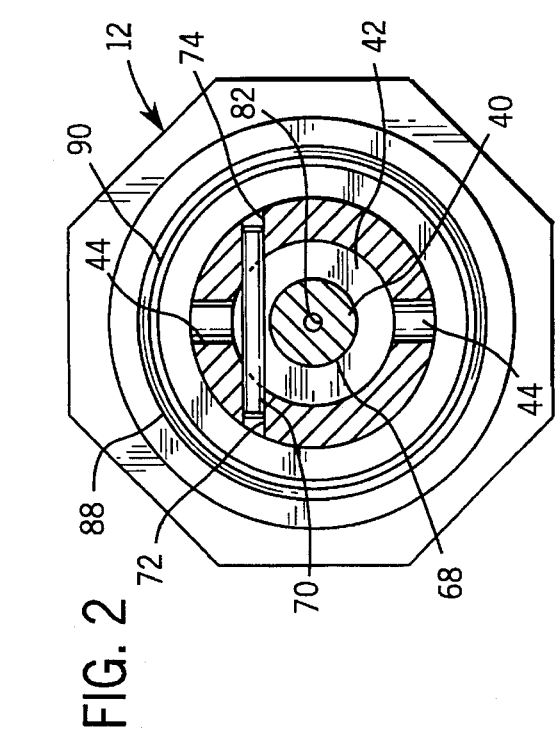
FIG. 2 is a cross-sectional view taken along the plane of the line 2—2 of FIG. 1.

FIG. 3 illustrates an alternate embodiment 10' of a valve of the invention. The valve 10' is identical to the valve 10 except as illustrated and as will be described below. In the valve 10', the same reference number is used to identify elements corresponding to elements in the valve 10, plus a prime (') sign.

One difference is that in the valve 10', a conically shaped nut 50' having a rounded and substantially closed end is used to further reduce noise by reducing closing drag and equalizing shift speed between the two axial directions of movement of the armature 36'. This occurs because air drag on the armature 36' is more equal in both directions (port 48' to ports 44' or ports 44' to port 48') than it is with the nut 50 of the first embodiment. A hole 51 is provided in the end of the nut 50' to allow for the passage of air to and from the bore 82'. Valve element 54' is shaped to continue the conical shape of the nut 50', while still providing sealing surface 62', and surfaces 56' and 66' are provided on a separate sleeve which is slipped over the shank 68' and held thereon by the element 54' and nut 50'. It is also noted that the shank 68' is longer than the reduced diameter portion 68 in the first embodiment. Also, a soft washer 71, made for example of an elastomer, is placed between the stop pin 70' and the face 42' to quiet noise in the opening direction.

A restriction plug 61 made of air permeable sintered powdered metal is pressed into the proximal end of bore 82. This provides an orificing effect which operates to slow shift speed of the armature 36' in both directions, and also acts as a filter to keep dirt and debris out of the bore 82 and out of the chamber at the distal end of the armature 36'. Also, six ports 44' are provided in the valve 10' to better accommodate high flow.

Many modifications and variations to the invention will be apparent to those skilled in the art. Therefore, the invention should not be limited to the embodiment described, but should be defined by the claims which follow.

We claim:

1. An electro-magnetically operated bidirectional two-way air valve, comprising:

a body having a main bore, a first port, a second port and a seat formed on an end of said main bore between said first port and said second port, said first port being coaxial with said main bore outside of said seat and said second port opening into a wall of said main bore inside of said seat;

a magnetically attractable armature slidably received in said main bore, said armature having a lapping portion at a distal end thereof which is of a diameter which is received in close sliding contact in said main bore and a neck portion at a proximal end thereof coaxial with said main bore, said neck portion extending past said second port toward said first port from said lapping portion, a largest diameter portion of said neck portion being smaller than said diameter of said lapping portion and defining a first axial face facing said first port; and a valve element secured against said face and extending beyond said largest diameter portion for seating on said seat in a closed position of said valve;

wherein an axial bore is formed in said armature from an end of said armature which is adjacent to said first port to an opposite end of said armature.

2. An air valve as claimed in claim 1, wherein said valve element is made of plastic.

3. An air valve as claimed in claim 2, wherein said valve element has a frusto-conical surface formed thereon facing said seat so that said frusto-conical surface seats on said seat in said closed position of said valve.

4. An air valve as claimed in claim 3, wherein said neck portion has a frusto-conical surface formed thereon on a second axial face which is opposite from said first axial face and which tapers in the same axial direction as said frusto-conical surface formed on said valve element.

5. An air valve as claimed in claim 1, wherein an axial face is formed on said armature at a junction of said neck portion and said lapping portion and said body includes a pin which extends across said main bore displaced from said main bore axis, a side of said pin abutting said face of said lapping portion to retain said armature in said bore.

6. An air valve as claimed in claim 5, wherein said valve element is annular, a shank of said neck portion extends through said valve element and a jam nut is threaded onto said shank to secure said valve element against said first axial face.

7. An air valve as claimed in claim 1, wherein the length of said lapping portion is at least three times the diameter of said lapping portion.

8. An air valve as claimed in claim 1, wherein an axial face is formed on said armature at a junction of said neck portion and said lapping portion and said body includes a pin which extends across said main bore displaced from said main bore axis, and an elastomeric washer is carried on said armature between said axial face and said pin, a side of said pin abutting said washer to retain said armature in said bore.

9. An air valve as claimed in claim 1, wherein said valve element is annular, a shank of said neck portion extends through said valve element and a jam nut is threaded onto said shank to secure said valve element against said first axial face, said jam nut having a surface thereon which tapers in the axial direction from the second port to the first port.

10. An air valve as claimed in claim 9, wherein said valve element continues the shape of said tapering surface.

11. An air valve as claimed in claim 1, wherein a restriction is provided in said axial bore.

12. An air valve as claimed in claim 1, wherein said restriction is an air permeable sintered powder metal plug which is pressed into the end of said axial bore adjacent to said first port.

* * * * *